(12) United States Patent
Tock et al.

(10) Patent No.: US 11,947,523 B2
(45) Date of Patent: Apr. 2, 2024

(54) MULTI-PARTY TRANSACTIONS IN A COMPUTERIZED DATABASE

(71) Applicant: International Business Machines Corporation, Armonk, NY (US)

(72) Inventors: Yoav Tock, Haifa (IL); Gennady Laventman, Haifa (IL); Artem Barger, Haifa (IL); Senthilnathan Natarajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 17/697,207

(22) Filed: Mar. 17, 2022

(65) Prior Publication Data

US 2023/0297560 A1 Sep. 21, 2023

(51) Int. Cl.
*G06F 16/23* (2019.01)

(52) U.S. Cl.
CPC ...... *G06F 16/2379* (2019.01); *G06F 16/2358* (2019.01)

(58) Field of Classification Search
None
See application file for complete search history.

(56) References Cited

U.S. PATENT DOCUMENTS

| | | | |
|---|---|---|---|
| 7,966,493 B2 * | 6/2011 | Puri | G06F 21/6227 713/176 |
| 10,951,417 B2 | 3/2021 | Qi | |
| 2020/0184448 A1 * | 6/2020 | Jain | G06Q 20/202 |

FOREIGN PATENT DOCUMENTS

| | | |
|---|---|---|
| CN | 107038578 B | 10/2020 |
| CN | 109165944 B | 1/2021 |
| CN | 112381543 A | 2/2021 |

OTHER PUBLICATIONS

Amazon Web Services (AWS) QLDB. See Online at: https://aws.amazon.com/qldb, Published Mar. 15, 2022.
Androulaki, E. et al., 'Hyperledger Fabric: A Distributed Operating System for Permissioned Blockchains'; Proceedings of the Thirteenth EuroSys Conference, Apr. 23-26, 2018.
Orion server. Open source. Online at https://github.com/hyperledger-labs/orion-server. Published Mar. 15, 2022.
(Continued)

*Primary Examiner* — Scott A. Waldron
(74) *Attorney, Agent, or Firm* — Dvir Gassner

(57) ABSTRACT

Maintaining, for each target key in a key-value computer database, a signature policy; creating a transaction candidate in the database based on a transaction context submitted to the database by a first user, the transaction candidate comprising: a key, a value comprising a transaction content and a signature of the first user, and a signors list of additional one or more users who are required to co-sign the transaction candidate before the transaction candidate is committed in the database as a transaction, wherein the signors list is automatically computed based on the signature policies of the one or more target keys; collecting a signature for the transaction candidate from at least one of the additional one or more users, according to the signors list; verifying that all signatures required by the signors list have been collected; and in response to the verification, committing the transaction content of the transaction candidate.

20 Claims, 3 Drawing Sheets

(56) References Cited

OTHER PUBLICATIONS

BigchainDB. Online at: https://www.bigchaindb.com, Published Mar. 15, 2022.

Denis Roio et al., "Zero knowledge multi party signatures with application to distributed authentication"; Online at: https://arxiv.org/pdf/2105.14527v1.pdf. May 30, 2021.

Fluree, 'The Web3 Data Platform'; Online at: https://flur.ee/, Published Mar. 15, 2022.

Hearn, M., et al., 'Corda: A distributed ledger'; Online at: https://www.r3.com/reports/corda-technical-whitepaper. Aug. 20, 2019.

Mark Rakhmilevich, 'Blockchain Tables in Oracle Database: Technology Convergence'; Online at: https://blogs.oracle.com/blockchain/post/blockchain-tables-in-oracle-database-technology-convergence (Oct. 1, 2019).

Oracle Blockchain Table. See: https://docs.oracle.com/en/database/oracle/oracle-database/21/nfcon/oracle-blockchain-table-268779556.html (Dec. 3, 2020).

Amazon Web Services (AWS) QLDB. See Online at: https://aws.amazon.com/qldb (published Mar. 16, 2022 or earlier).

Orion server. Open source: Online at: https://github.com/hyperledger-labs/orion-server (published Mar. 16, 2022 or earlier).

BigchainDB. Online at: https://www.bigchaindb.com (published Mar. 16, 2022 or earlier).

Fluree, 'The Web3 Data Platform'; Online at: https://flur.ee/ (published Mar. 16, 2022 or earlier).

\* cited by examiner

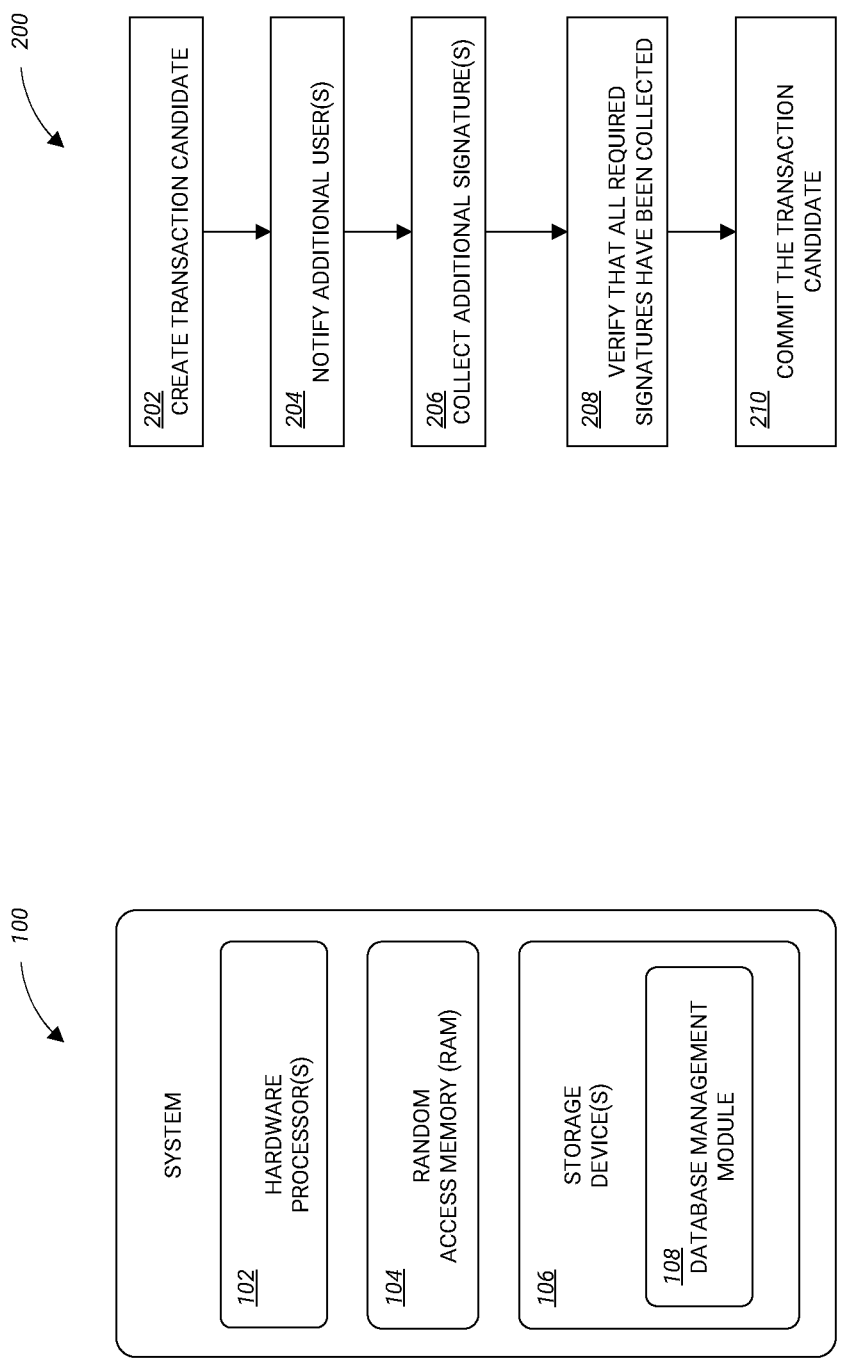

MULTI-PARTY TRANSACTIONS IN A COMPUTERIZED DATABASE

BACKGROUND

The invention relates to the field of computerized databases.

One type of computerized database is a "key-value database." A key-value database stores versioned key-value pairs: the tuple <k,v,n> describes key k, value v, at version n. Every time a key-value is written, the version is incremented.

When a user submits a read or write transaction to the database, the transaction is not immediately executed but is first evaluated as a candidate. Candidate transactions express their dependency on the state of the database by including a read set and a write set. The read set includes the key-version pairs to be read during the transaction, for example Rset={<k1,n1>, <k2,n2>, . . . }. The write set transaction the keys to be written in the transaction, together with the value to be written, for example Wset={<k1,v1>, <k3,v3>, . . . }.

A transaction will commit only if the versions of the records in the read set have the same versions as those in the database itself. If the versions in the database are different than the versions in the read set, the transaction is rejected. This technique is often referred to as Multi-Version Concurrency Control (MVCC).

A key-value database typically has each record (key-value pair) associated with an Access Control List (ACL), which includes read-write permissions for the users of the database. These can be expressed, for example, by a list of users who can only read, and a list of users who can both read and write:

Key: "K", Value: "V", Version: N; ACLs: {Readers: {"Alice", "Bob"}; Writers: {"Charlie" } }.

A transaction can modify this target record only if it is from "Charlie"; and a query can read the record only if it is from either "Alice", "Bob", or "Charlie" (writers are implicitly readers as well).

A user submitting a transaction that carries a read-set and a write-set must have read access to all the keys in the read-set and write access to all the keys in the write-set.

In some key-value databases, each transaction is signed by the user submitting it, and the database server verifies the signature against a stored certificate of the user. This way, each modification to the state is cryptographically identified, and by keeping a log of all transactions non-repudiation is achieved. For that purpose, when users are enrolled into the database system, their certificate is provided to the database by an administrator.

When a transaction is signed in this way, it is usually organized in an "envelope" that contains the transaction content. For example, the transaction content is simply an object that contains:

the read set: Rs={<k1,n1>, <k2,n2>, . . . },
the write set: Ws={<k1,v1>, <k3,v3>, . . . }, as well as other fields that may alter the semantics of committing the transaction, such as isolation levels, etc.

The user marshals the content, concatenates its user identifier (and possibly a nonce) to it, and signs that piece of data:

Signature <of Alice>=Sign <by Alice>(marshaled content+user-id+nonce), (where "+" means concatenation).

Therefore, a signed transaction can be represented as:
1. Content.
2. A tuple {User-ID, Nonce, Signature}.

Upon receiving such a transaction, the server will first verify that the signature in (2) matches the certificate it has for the User-ID.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a computer-implemented method comprising, in a key-value computer database: automatically maintaining, for each target key in the database, a signature policy; automatically creating a transaction candidate in the database, based on a transaction context submitted to the database by a first user, wherein the transaction candidate comprises: a key having a name that identifies the key as a transaction candidate, a value comprising a transaction content and a signature of the first user, wherein the transaction content comprises at least one of a read set and a write set that are configured, respectively, to read or write a value of each of one or more target keys, and a signors list comprising: a list of additional one or more users who are required to co-sign the transaction candidate before the transaction candidate is committed in the database as a transaction, wherein the signors list is automatically computed based on the signature policies of the one or more target keys; based on the signors list, automatically notifying the additional one or more users of the transaction candidate; automatically collecting a signature for the transaction candidate from at least one of the additional one or more users, according to the signors list, wherein the collecting comprises receiving, from each respective user, a new transaction context that comprises: reading the transaction candidate from the database, and writing, to the value of the transaction candidate in the database, a signature tuple comprising an identifier of the respective user and a signature of the respective user; automatically verifying that all signatures required by the signors list have been collected; and in response to the verification, automatically committing the transaction content of the transaction candidate, wherein the committing comprises reading or writing the value of the other key in the database, respective of the transaction content.

Another embodiment is directed to a system comprising: (a) at least one hardware processor, and (b) a non-transitory computer-readable storage medium having program code embodied therewith, the program code executable by said at least one hardware processor to, automatically: maintain, for each target key in a key-value computer database, a signature policy; create a transaction candidate in the database, based on a transaction context submitted to the database by a first user, wherein the transaction candidate comprises: a key having a name that identifies the key as a transaction candidate, a value comprising a transaction content and a signature of the first user, wherein the transaction content comprises at least one of a read set and a write set that are configured, respectively, to read or write a value of each of one or more target keys, and a signors list comprising: a list of additional one or more users who are required to co-sign the transaction candidate before the transaction candidate is committed in the database as a transaction, wherein the signors list is automatically computed based on the signature policies of the one or more target keys; based on the signors list, notify the additional one or more users of the transaction candidate; collect a signature for the transaction candidate from at least one of the additional one or more users, according to the signors list, wherein the collecting comprises receiving, from each respective user, a new transaction context that comprises: reading the transaction candidate from the database, and writing, to the value of the transaction candidate in the database, a signature tuple comprising an identifier of the respective user and a signature of the respective user; verify that all signatures required by the signors list have been collected; and in response to the verification, commit the transaction content of the transaction candidate, wherein the committing comprises reading or writing the value of the other key in the database, respective of the transaction content.

Yet another embodiment is directed to a computer program product comprising a non-transitory computer-readable storage medium having program code embodied therewith, the program code executable by at least one hardware processor to, automatically: maintain, for each target key in a key-value computer database, a signature policy; create a transaction candidate in the database, based on a transaction context submitted to the database by a first user, wherein the transaction candidate comprises: a key having a name that identifies the key as a transaction candidate, a value comprising a transaction content and a signature of the first user, wherein the transaction content comprises at least one of a read set and a write set that are configured, respectively, to read or write a value of each of one or more target keys, and a signors list comprising: a list of additional one or more users who are required to co-sign the transaction candidate before the transaction candidate is committed in the database as a transaction, wherein the signors list is automatically computed based on the signature policies of the one or more target keys; based on the signors list, notify the additional one or more users of the transaction candidate; collect a signature for the transaction candidate from at least one of the additional one or more users, according to the signors list, wherein the collecting comprises receiving, from each respective user, a new transaction context that comprises: reading the transaction candidate from the database, and writing, to the value of the transaction candidate in the database, a signature tuple comprising an identifier of the respective user and a signature of the respective user; verify that all signatures required by the signors list have been collected; and in response to the verification, commit the transaction content of the transaction candidate, wherein the committing comprises reading or writing the value of the other key in the database, respective of the transaction content.

In some embodiments, the signors list is computed according to a policy of the one or more target keys in the database.

In some embodiments, the signors list expresses a combination of the additional one or more users in a Boolean format.

In some embodiments, the method further comprises, or the program code is further executable to, automatically maintain a per-user queue in the database, wherein the per-user queue comprises a key identifier of any transaction candidate which a respective user is invited to sign; and the notifying comprises at least one of: enabling each of the additional one or more users to poll his or her respective queue and to subsequently read the transaction candidate from the database, and transmitting an electronic notification to a computerized device of each of the additional one or more users.

In some embodiments, the verifying that signatures from all of the one or more users have been collected comprises: reading the value of the transaction candidate, to verify that it comprises signatures and identifiers of all of the one or more users.

In some embodiments, the name that identifies the key as a transaction candidate: is provided by the first user with the transaction context; or is automatically assigned responsive to a determination that there are additional one or more users, per the policy, that are required to sign the transaction candidate.

In some embodiments, the method further comprises, or the program code is further executable to, following the committing of the transaction content of the transaction candidate: remove the transaction candidate from the database.

In some embodiments, the method further comprises, or the program code is further executable to, enable each of the additional one or more users to withdraw his or her signature, by receiving a null signature from the respective user and overwriting the collected signature of the respective user with the null signature.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 1 is a block diagram of an exemplary system for automated management of multi-party transactions in a key-value computerized database, according to an embodiment.

FIG. 2 is a flowchart of a method for automated management of multi-party transactions in a key-value computerized database, according to an embodiment.

DETAILED DESCRIPTION

Figure 3:
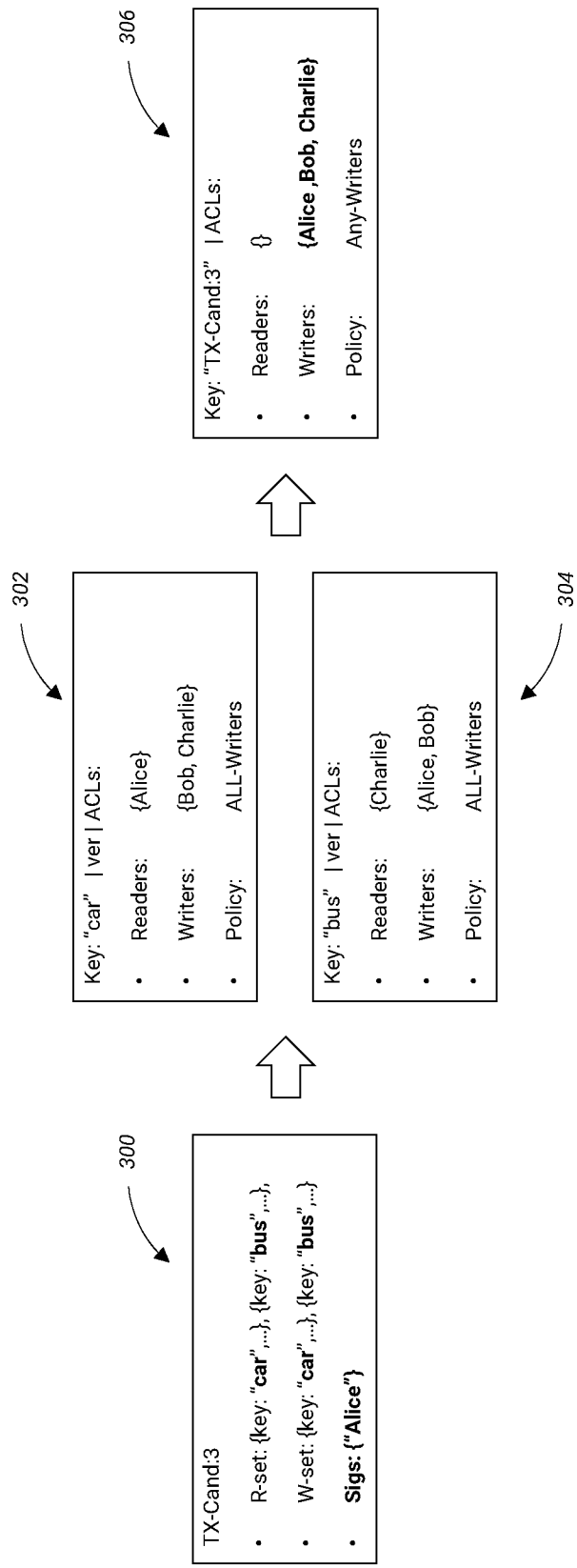
FIG. 3 is a block diagram illustrating policy computation, according to an embodiment.

Disclosed herein as a technique, embodied as a method, a system, and a computer program product, for automated management of multi-party (also "multi-user") transactions in a computerized database, such as a key-value database or any other type of database which includes and utilizes ACLs or a similar mechanism for per-record read/write permissions. The following description refers to a key-value database merely for reasons of simplicity.

Advantageously, the present technique can facilitate key-value database transactions that require approval by multiple parties in a manner which eliminates direct (and often insecure) communication between the parties. The technique confines communications to database sessions conducted by the parties, such that all the parties can (and need to) do in connection with the transaction is limited to read and write operations committed in the database itself when the parties and logged into it.

Before describing the technique in detail, a brief discussion of multi-party database transactions is presented.

Multi-party database transactions are transactions that involve more than one user. This type of transaction goes through ("committed," in database terminology) only if it is agreed upon by multiple users. For example, let us assume there are two accounts (e.g., bank accounts, cryptocurrency accounts/wallets, or other types of token accounts) for users Alice and Bob, and that these users (or some management/administration authority of the database) require signatures of both users for each transaction involving a change to any of these individual accounts.

Assume the following database records pertaining to these accounts:

TABLE 1

Exemplary database records of two user accounts

| Key | Value | Version | Read/Write ACL |
|---|---|---|---|
| alice-account | 100 | 10 | {Alice, Bob}/{Alice} |
| bob-account | 200 | 20 | {Alice, Bob}/{Bob} |

A transaction to transfer 10 tokens (which could be of a FIAT currency, cryptocurrency, or other tokenized monetary value) from one target key (account, in this example) to another would require the consent of two parties, Alice and Bob, because the first target record has only Alice as a writer, and the second target record has only Bob as a writer. The following transaction context exemplifies the transaction:

```
TX-begin
    IF alice-account >= 10 THEN
        alice-account = alice-account - 10
        bob-account = bob-account + 10
TX-commit
```

The term "transaction context," as used herein and as also customary in the art, refers to a series of commands, such as read and/or write commands, that are submitted to the database by a user in order to perform a transaction. The commands are typically phrased using a certain programming language or other programming syntax that is readable by the database.

As stated above, a transaction according to the exemplary transaction context above would require the signatures of both Alice and Bob, according to the ACLs in Table 1. The read/write sets for this transaction are:

Read-set: {<alice-account, 10>, <bob-account, 20>}
Write-set: {<alice-account, 90>, <bob-account, 110>}

If the transaction is submitted to the database accompanied by Alice's and Bob's signatures, and MVCC checks are valid, it would be committed as a valid transaction.

Another scenario that requires multiple signatures is a when it is desired to enforce that a change to a particular key, e.g. a joint account, can be made only with the agreement of all (or some of) the owners of that key. For instance, the key could represent a joint account that requires the agreement of all (or some of) the owners of that account.

In either of these multi-party transaction scenarios, the present technique is based on the addition of what may be referred to as a "policy" to keys in the database (inside their read/write ACLs or separately from the ACLs), that specifies the combination of signatures required for each operation. A transaction will have to carry the correct set of signatures in order to be considered valid and committed.

For example, assume a scenario involving the following database records:

TABLE 2

Exemplary database records which include a policy

| Key | Value | Version | Read/Write ACL | Policy |
|---|---|---|---|---|
| joint-account | 100 | 10 | {*}/{Alice, Bob} | ALL-writers |
| charlie-account | 200 | 20 | {*}/{Charlie} | ANY-writers |

A transaction to transfer 10 tokens from the joint-account key to the charlie-account key would require the consent of the two owners (write permission holders) of the joint-account key, Alice and Bob, as well as the consent of Charlie who owns (has write permission to) the charlie-account key. The following transaction context exemplifies the transaction:

```
TX-begin
    IF joint-account >= 10 THEN
        joint-account = joint-account - 10
        charlie-account = charlie-account + 10
TX-commit
```

The present technique, advantageously, maintains a signature policy for each key in the database (or at least each key which may be the target of a transaction initiated by a user of the database). Based on this policy, a list of signors for each transaction may be automatically computed, as discussed further below.

One problem with this exemplary transaction is that the collection of signatures for the transaction typically requires a communication channel out of the scope of the database itself. For example, the transaction initiator may start a transaction, sign it, and then send it via an electronic message (e.g., email, SMS, etc.) to the other users that are required to sign, collect their responses, aggregate the signatures on to the transaction, and submit it. Even if the other users directly sign the transaction during an interaction with the database itself, there is still the problem of the initial notification which they have received from the initiator outside the boundaries of the database.

This extra round of communication introduces a host of issues. Database users need to be able to locate each other, connect with each other outside the framework of the database, and be able to authenticate each other's identity. This breaks the convenient database programming model of doing everything against the database, and not communicating directly with other users. While there could be some additional infrastructure external to the database, such as messaging or queuing systems, that can slightly ameliorate the problem, they still do not solve them completely nor do they prevent transaction-related information from being communicated outside the database.

The present technique simplifies and streamlines the process of collecting the set of signatures required for a multi-party transaction. The technique may involve a database API and a mechanism that eliminates direct user-to-user communication altogether, significantly simplifying the process of constructing and executing multi-party transactions, and making it much more secure and reliable.

The present technique may utilize the read ACLs and write ACLs for every key in the database and augment them with a policy that defines which combinations of user signatures are necessary in order to render a transaction as valid.

The present technique may define the manner in which a user submits a transaction proposal (also "candidate") to the database; if the proposal does not fulfill the multi-party signature policy, it awaits further input—additional signatures—from required parties. The users required to co-sign the transaction candidate may be presented with an advantageous interface and mechanism to read the candidate, co-sign, and send their signature back to the database. The database may monitor the accumulation of signatures for the transaction candidate and commit the transaction candidate automatically when the set of signatures fulfills the multi-party signature policy.

Optionally, the present technique also includes a mechanism for notifying users that a transaction candidate that requires their co-signature has been submitted to the database, a mechanism to perform MVCC violation checks, and a mechanism for "garbage collection."

Reference is now made to FIG. 1, which shows a block diagram of an exemplary system 100 for automated management of multi-party transactions in a key-value computerized database, according to an embodiment. System 100 may include one or more hardware processor(s) 102, a random-access memory (RAM) 104, and one or more non-transitory computer-readable storage device(s) 106. System 100 may essentially be a database management system (DBMS) which includes and manages a key-value computerized database. To simplify the ongoing discussions, system 100 may be simply referred to as a "database."

Storage device(s) 106 may have stored thereon program instructions and/or components configured to operate hardware processor(s) 102. The program instructions may include one or more software modules, such as a database management module 108. The software components may include an operating system having various software components and/or drivers for controlling and managing general system tasks (e.g., memory management, storage device control, power management, etc.), and facilitating communication between various hardware and software components.

System 100 may operate by loading instructions of database management module 108 into RAM 104 as they are being executed by processor(s) 102. The instructions of database management module 108 may cause system 100 to operate as a conventional DBMS (as known in the art), with the added functionality of the present technique, namely—facilitating multi-party transactions by collecting signatures according to a defined policy.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

Those instructions of database management module 108 which constitute the present technique are now discussed with reference to the flowchart of FIG. 2, which illustrates a method 200 for automated management of multi-party transactions in a key-value computerized database, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

It should be noted that the description of method 200 contains examples pertaining to transactions that are aimed at writing to the database. This is done only for reasons of simplicity. Method 200 applies similarly to transactions aimed at just reading from the database, and those of skill in the art will immediately recognize the adaptations to the following description required to accommodate such read-ing-oriented transactions.

In a step 202, a transaction candidate may be created in the database, based on a transaction context submitted to the database by a first user. The transaction context may be similar to the two transaction context examples given above.

The transaction candidate may include a key, at least one value (which includes a transaction content and a signature of the first user), an ACL that includes a policy for the transaction candidate itself (not to be confused with a list of those users who need to sign), and a signors list (computed based on the policies of the target keys). For example:

Key: tx-candidate-<TxID>
Value: {tx-content, map[user]signature}
ACLs: {Readers: { }; Writers: {"Alice", "Bob", "Charlie", "Dave"}; Policy: ANY-Writers}
Signors: {("Alice" AND "Bob") AND ("Charlie" OR "Dave")}

The name of the key may be set such that it indicates to the database that this is a transaction candidate and not a regular key. In this example, the prefix "tx-candidate" serves that purpose, and "<TxID>" may be some unique identifier of the candidate. Such name may indicate to the database that this key requires collection of signatures from multiple users. The database may assign such key name to the transaction candidate based, for example, on the first user including a respective flag in the submitted transaction context.

The value in the transaction candidate may include a transaction content ("tx-content") that defines the transaction which the first user desires to perform in the database. The transaction may involve one or more target keys ("regular" keys) stored in the database. For example, if the transaction is a currency transfer between two accounts, then the transaction content may involve two keys associated with these accounts:

TABLE 3

Exemplary keys to be affected by a transaction content

| Key | Value | Version | Read/Write ACL | Policy |
|---|---|---|---|---|
| account-A | 100 | 10 | { }/{Alice, Bob} | ALL-writers |
| account-B | 200 | 20 | { }/{Charlie, Dave} | ANY-writers |

If the transaction is aimed at writing data to the database, as in the currency transfer example, the transaction content may include the following commands:

```
TX-begin
IF account-A >= 10 THEN
    account-A = account-A - 10
    account-B = account-B + 10
TX-commit
``` as well as a read set (to enable a reading of a value before overwriting it) and a write set (to facilitate the overwriting). For example:

Read-set: {<account-A, 10>, <account-A, 20>}
Write-set: {<account-A, 90>, <account-B, 210>}

The signors list in the transaction candidate defines who must sign it in order for the transaction to be committed. The signors list may be computed based on the ACLs of the target keys. In the example of Table 3, writing to account-A requires the signatures of both Alice and Bob, whereas writing to account-B requires the signatures of Charlie or Dave. Thus, each of the following sets of signers will satisfy the requirements for a transaction involving writing to both target keys:

{Alice, Bob, Charlie}, or
{Alice, Bob, Dave}, or
{Alice, Bob, Charlie, Dave}.

Accordingly, the computed signors list, as expressed in the transaction candidate ACLs, is {("Alice" AND "Bob") AND ("Charlie" OR "Dave")}, as mentioned above. This Boolean format of the signors list is exemplary only, and other formats that define a combination of users may be used.

In addition to the aforementioned manner of computing the signors list, or as an alternative to such computation, the signor list may be computed or otherwise derived from a rule that defines the logic of minimal signatories required for certain types of transactions, as discussed further below.

If the transaction is only aimed at reading data from the database, then the transaction content does not need to include a write set. For instance, such transaction may be one which is aimed at obtaining sensitive data from the database, which is to be provided to the first user only if other users approve.

In either case, the transaction content may be defined as immutable, so that no user can change the scope of the intended transaction; if a scope change is required, the first user will have to submit a separate transaction context.

The value in the transaction candidate may further include a signature of the first user (in "map[user]signature", or a similar map from each user identifier to his or her signature-containing object), with room to append additional signatures during the signature collection step, discussed further below. Any of the first user and subsequent users may withdraw their own signature by re-signing the transaction candidate with an invalid or empty signature (hereinafter a "null" signature), overwriting their original signature.

Various types of policies may be considered for target keys. For example: an "Any" policy may suffice with a signature of only a single user of the respective key; an "All" policy requires the signatures of all users identified in the ACL of the respective target key; a "Majority" policy requires the signatures of the majority of users identified in the ACL of the respective target key; an "At least K" policy requires the signatures of at least K users (where K is an integer) identified in the ACL of the respective target key; and an "At least K %" policy requires the signatures of at least K % users (where 0<K≤100) identified in the ACL of the respective target key. Other types of policies are also possible, as those of skill in the art will recognize.

In addition to such per-key policies, more general policies may be used, which either complement or replace the per-key policies. For example, a general policy may define that transactions exceeding a certain monetary or token amount require the signature of all, a majority of, at least K, or at least K % of writers of a target key, even if the individual policy of that key is just "Any-Writers." As another example, a general policy may define that transactions involving a certain type of key (e.g., a key in which a certain type of entity has ownership interest, such as a large or a small entity) require a signature by a different (more permissive or more restrictive) subset of writers than the key's own policy. Such general policies may eventually be expressed, after their computation, in the signors list included in every transaction candidate.

The policy for the transaction candidate itself (not to be confused with the policies of the target keys defined in the transaction content of the transaction candidate) may be automatically computed according to the ACLs of the keys involved in the transaction candidate. Interim reference is now made to FIG. 3, which is a block diagram illustrating such computation.

On the left of the figure there is shown a transaction candidate 300 that was created based on a transaction context submitted and signed by a first user, Alice.

This transaction candidate 300 is intended to affect two keys stored in the database, shown in the middle of the figure: "car" 302 and "bus" 304.

The ACLs associated with the "car" key list Alice as a reader and Bob and Charlie as writers. The ACLs associated with the "bus" key list Charlie as a reader and Alice and Bob as writers.

Accordingly, the ACLs 306 of the transaction candidate may be computed as a union of the ACLs of the "car" and "bus" keys: the writers are Alice, Bob, and Charlie, and the readers are also all three users (since a writer is inherently also a reader), but stating so in the ACLs is usually unnecessary. The policy of these ACLS, in turn, may be computed as Any-Writers, because each of the writers should be able to individually write his or her signature to the transaction candidate key. Therefore, the list of users which should be invited to co-sign the transaction candidate is the writers (Bob and Charlie—excluding Alice who is the first user and naturally aware of the transaction candidate).

Reference is now made back to FIG. 2. In a step 204, additional one or more users may be notified of the transaction candidate by the database, effectively inviting them to sign it. These additional one or more users are those listed in the signors list of the transaction candidate. Returning to the example of Table 3, these will be Bob, Charlie, and Dave (with Alice being the first user and therefore not requiring a notification).

The notification may be active and/or passive. An active notification may be an electronic notification (e.g., message) transmitted by the database to computerized devices of the additional user(s), such as an email message, an SMS message, a push notification, etc. Optionally, if a high level of security is required, the notification will not include any details as to the substance of the intended transaction (namely, nothing taken from the transaction content of the transaction candidate), but just a simple message inviting the respective user to log into the database to observe the transaction candidate and sign it there. Otherwise, the message can include details as to the transaction candidate, taken from the transaction content of the transaction candidate.

A passive notification may include a notification which remains within the boundaries of the database, not involving any external messages to users. For example, a per-user queue may be maintained in the database, which they user may be enabled to poll when being logged into the database. Each user's queue may include a list of all candidate transactions in which that user's signature is requested. Each entry in the queue, referring to a certain candidate transaction, may include a key identifier (name) of the respective transaction candidate which the user is requested to sign, so that the user may read the transaction candidate and then write his or her signature to the value of that key.

A combination of active and passive notifications is also possible. For example, the database may transmit a notification to a user's computerized device, alerting the user of a new entry in his or her queue. The user may then log into the database to observe that new entry and optionally sign the pertinent transaction candidate.

In step 206, additional one or more signatures to the transaction candidate may be collected, in order to satisfy the requirements in the signors list. Those of the user(s) invited to co-sign in step 204 who wish to indeed co-sign, may now submit their signatures. Each such signature may be submitted by submitting to the database a new transaction context that includes instruction to read the transaction candidate from the database, and to write, to the value of the transaction candidate, a signature tuple comprising an identifier of the respective user and his or her signature. The database receives this submitted transaction context and appends the user identifier and signature to the value of the transaction candidate (e.g., to "map [user] signature").

In step 208, the database may verify that all signatures required by the signors list have been collected. To this end, the database may check, in response to each submitted signature, whether the signatures collected so far meet the requirements of the signors list. Namely, the database may read the value of the transaction candidate, to verify that it contains signatures and identifiers of a sufficient number or percentage of users are required by the policy.

In step 210, in response to a positive verification, the database may commit the transaction content of the transaction candidate. The committing includes reading the stored versions of the keys included in the read-set, and comparing them to the versions that are in the read set; this is, essentially, a MVCC validation check. Only if the respective key-version pairs match, will the transaction commit as "valid." A valid transaction will also write the values of the key-value pairs in the write set to the database. For example, if the transaction content instructs a currency transfer between two accounts, as in the example of Table 3, the committing of the transaction candidate will include reading the version the transferring account (to verify it has not changed since the initiating user last checked that it has sufficient funds, as required by the instruction "IF account-A>=10" in the example, and that the computation "account-A=account-A−10" still holds), and reading the version of the receiving account (to verify that it has not changed since the computation "account-B=account-B+10" in the example). Subsequently, if the versions match, updates are written to the balances of account-A and account-B respective of the transferred amount.

If a violations occurs (namely, the versions do not match), there is no prospect for collecting additional signatures and the transaction candidate may be removed from the database.

Method 200 optionally includes another step (not indicated in the figure) of what is referred to in the art as "garbage collection." Naturally, some transaction candidates will never be fully signed and will never commit. In order to prevent the accumulation of such stale transaction candidates, a timeout may be associated with each transaction candidate, after which the candidate is removed. In another scenario, some transaction candidates may depend on each other, for example by competing on the read and write to a certain key. If one is fully signed and commits, the other one will never be able to commit as valid. However, the second one may not receive any co-signatures after the first one commits, so there would be no trigger to re-evaluate it and remove it. To solve this problem and avoid accumulation of such transaction candidates, the database may build and maintain a dependency graph between transaction candidates, and when one commits, the database evaluates all those that depend on it and removes them if they are deemed to be stale.

Figure 4:
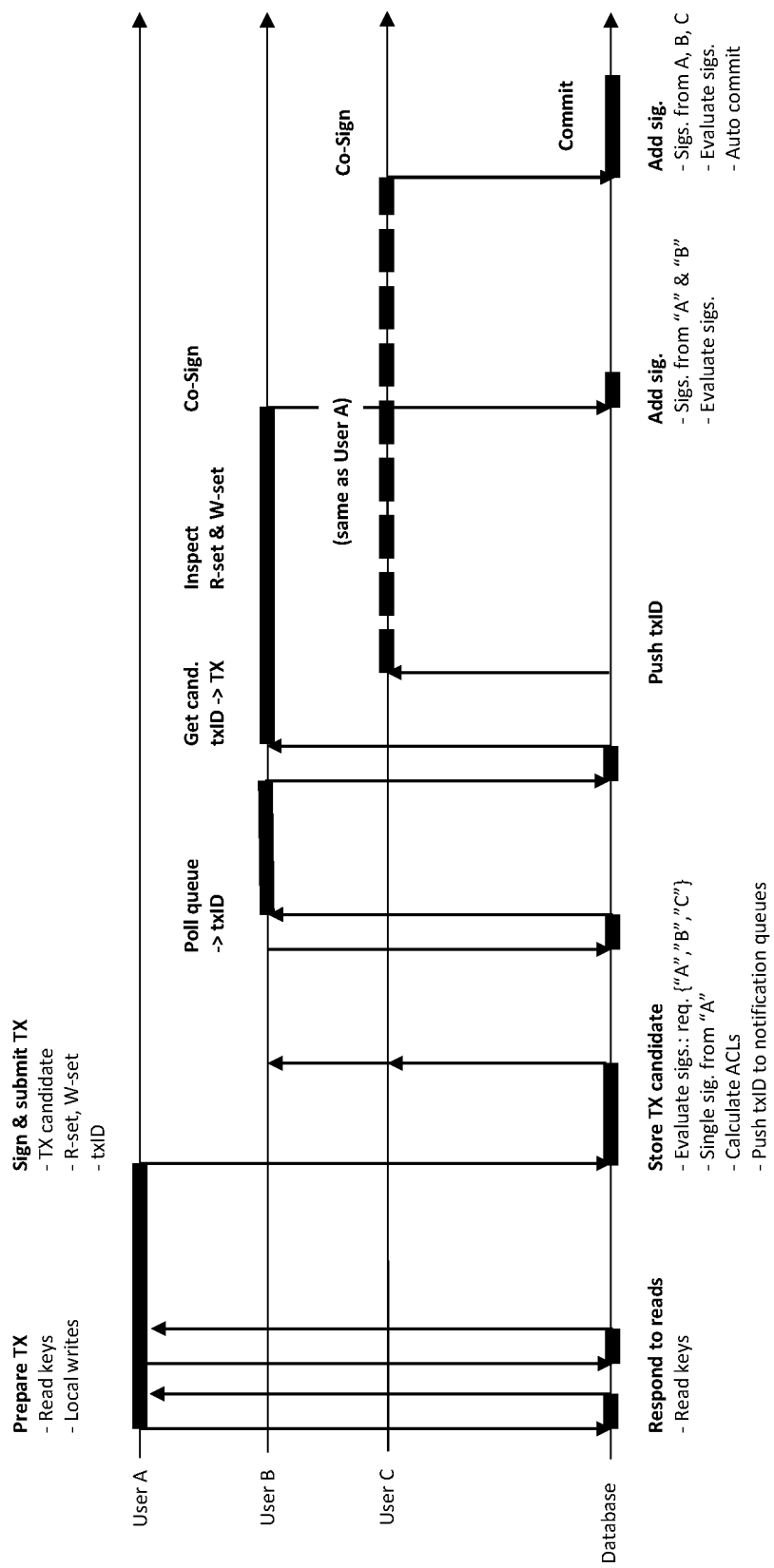
FIG. 4 is a graph showing a temporal flow of an exemplary transaction, according to an embodiment.

Reference is now made to FIG. 4, which is a graph showing the temporal flow of an exemplary transaction, from the time it is initiated by a first user to the time it is finally committed. This flow corresponds to the different steps of method 200 of FIG. 2. This example involves three users, identified as User A, User B, and User C.

User A prepares a transaction by reading from the database, performing local writes, and accumulating the read set and write set. He or she then signs and submits the transaction candidate to the database.

The database evaluates the signatures on the transaction ("TX") candidate, and because it expects signatures from {A,B,C} it stores the candidate. The database writes notifications to the queues of B and C User B, who elected to be passively notified, polls the notification queue, observes the notification on the respective txID, reads the TX candidate, and evaluates it by inspecting the read set and the write set. She then co-signs the TX candidate, which sends the database her signature on the TX content, and the txID.

The database adds the new signature to the TX candidate and evaluates the signatures again. Since there are only two out of the required three, it continues to wait.

In parallel, User C, who elected to receive an active notification, receives a push notification of the TX candidate to his computerized device. He then follows the same process as User B and co-signs the TX candidate.

When the database receives User C's signature it evaluates the TX candidate again, this time successfully verifying that all required signatures, per the policy, have been collected (signatures of A, B, and C), and then commits the TX candidate.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range −10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising, in a key-value computer database:
   automatically maintaining, for each target key in the database, a signature policy;
   automatically creating a transaction candidate in the database, based on a transaction context submitted to the database by a first user, wherein the transaction candidate comprises:
      a key having a name that identifies the key as a transaction candidate,
      a value comprising a transaction content and a signature of the first user, wherein the transaction content comprises at least one of a read set and a write set that are configured, respectively, to read or write a value of each of one or more target keys, and
      a signors list comprising: a list of additional one or more users who are required to co-sign the transaction candidate before the transaction candidate is committed in the database as a transaction, wherein the signors list is automatically computed based on the signature policies of the one or more target keys;
   based on the signors list, automatically notifying the additional one or more users of the transaction candidate;
   automatically collecting a signature for the transaction candidate from at least one of the additional one or more users, according to the signors list, wherein the collecting comprises receiving, from each respective user, a new transaction context that comprises: reading the transaction candidate from the database, and writing, to the value of the transaction candidate in the database, a signature tuple comprising an identifier of the respective user and a signature of the respective user;
   automatically verifying that all signatures required by the signors list have been collected; and
   in response to the verification being positive, automatically committing the transaction content of the transaction candidate.

2. The computer-implemented method of claim 1, wherein:
   the signors list is computed according to a policy of the one or more target keys in the database.

3. The computer-implemented method of claim 1, wherein:
   the signors list expresses a combination of the additional one or more users in a Boolean format.

4. The computer-implemented method of claim 1, wherein:
   the method further comprises automatically maintaining a per-user queue in the database, wherein the per-user queue comprises a key identifier of any transaction candidate which a respective user is invited to sign; and
   the notifying comprises at least one of:
      enabling each of the additional one or more users to poll his or her respective queue and to subsequently read the transaction candidate from the database, and
      transmitting an electronic notification to a computerized device of each of the additional one or more users.

5. The computer-implemented method of claim 1, wherein the verifying that signatures from all of the one or more users have been collected comprises:
   reading the value of the transaction candidate, to verify that it comprises signatures and identifiers of all of the one or more users.

6. The computer-implemented method of claim 1, wherein the name that identifies the key as a transaction candidate:
   is provided by the first user with the transaction context; or
   is automatically assigned responsive to a determination that there are additional one or more users, per the policy, that are required to sign the transaction candidate.

7. The computer-implemented method of claim 1, further comprising, following the committing of the transaction content of the transaction candidate:
   removing the transaction candidate from the database.

8. The computer-implemented method of claim 1, further comprising:
   enabling each of the additional one or more users to withdraw his or her signature, by receiving a null signature from the respective user and overwriting the collected signature of the respective user with the null signature.

9. A system comprising:
   (a) at least one hardware processor; and
   (b) a non-transitory computer-readable storage medium having program code embodied therewith, the program code executable by said at least one hardware processor to, automatically:
      maintain, for each target key in a key-value computer database, a signature policy;
      create a transaction candidate in the database, based on a transaction context submitted to the database by a first user, wherein the transaction candidate comprises:
         a key having a name that identifies the key as a transaction candidate,
         a value comprising a transaction content and a signature of the first user, wherein the transaction content comprises at least one of a read set and a write set that are configured, respectively, to read or write a value of each of one or more target keys, and
         a signors list comprising: a list of additional one or more users who are required to co-sign the transaction candidate before the transaction candidate is committed in the database as a transaction, wherein the signors list is automatically computed based on the signature policies of the one or more target keys;

based on the signors list, notify the additional one or more users of the transaction candidate;

collect a signature for the transaction candidate from at least one of the additional one or more users, according to the signors list, wherein the collecting comprises receiving, from each respective user, a new transaction context that comprises:

reading the transaction candidate from the database, and writing, to the value of the transaction candidate in the database, a signature tuple comprising an identifier of the respective user and a signature of the respective user;

verify that all signatures required by the signors list have been collected; and in response to the verification being positive, commit the transaction content of the transaction candidate.

10. The system of claim 9, wherein:
the signors list is computed according to a policy of the one or more target keys in the database.

11. The system of claim 9, wherein:
the signors list expresses a combination of the additional one or more users in a Boolean format.

12. The system of claim 9, wherein:
the program code is further executable to maintain a per-user queue in the database, wherein the per-user queue comprises a key identifier of any transaction candidate which a respective user is invited to sign; and
the notifying comprises at least one of:
enabling each of the additional one or more users to poll his or her respective queue and to subsequently read the transaction candidate from the database, and
transmitting an electronic notification to a computerized device of each of the additional one or more users.

13. The system of claim 9, wherein the verifying that signatures from all of the one or more users have been collected comprises:
reading the value of the transaction candidate, to verify that it comprises signatures and identifiers of all of the one or more users.

14. The system of claim 9, wherein the name that identifies the key as a transaction candidate:
is provided by the first user with the transaction context; or
is automatically assigned responsive to a determination that there are additional one or more users, per the policy, that are required to sign the transaction candidate.

15. The system of claim 9, wherein the program code is further executable, following the committing of the transaction content of the transaction candidate, to:
remove the transaction candidate from the database.

16. The system of claim 9, wherein the program code is further executable to:
enable each of the additional one or more users to withdraw his or her signature, by receiving a null signature from the respective user and overwriting the collected signature of the respective user with the null signature.

17. A computer program product comprising a non-transitory computer-readable storage medium having program code embodied therewith, the program code executable by at least one hardware processor to, automatically:

maintain, for each target key in a key-value computer database, a signature policy;

create a transaction candidate in the database, based on a transaction context submitted to the database by a first user, wherein the transaction candidate comprises:

a key having a name that identifies the key as a transaction candidate, a value comprising a transaction content and a signature of the first user, wherein the transaction content comprises at least one of a read set and a write set that are configured, respectively, to read or write a value of each of one or more target keys, and a signors list comprising: a list of additional one or more users who are required to co-sign the transaction candidate before the transaction candidate is committed in the database as a transaction, wherein the signors list is automatically computed based on the signature policies of the one or more target keys;

based on the signors list, notify the additional one or more users of the transaction candidate;

collect a signature for the transaction candidate from at least one of the additional one or more users, according to the signors list, wherein the collecting comprises receiving, from each respective user, a new transaction context that comprises: reading the transaction candidate from the database, and writing, to the value of the transaction candidate in the database, a signature tuple comprising an identifier of the respective user and a signature of the respective user;

verify that all signatures required by the signors list have been collected; and in response to the verification being positive, commit the transaction content of the transaction candidate.

18. The computer program product of claim 17, wherein:
the signors list is computed according to a policy of the one or more target keys in the database; and
the signors list expresses a combination of the additional one or more users in a Boolean format.

19. The computer program product of claim 17, wherein:
the program code is further executable to maintain a per-user queue in the database, wherein the per-user queue comprises a key identifier of any transaction candidate which a respective user is invited to sign; and
the notifying comprises at least one of:
enabling each of the additional one or more users to poll his or her respective queue and to subsequently read the transaction candidate from the database, and
transmitting an electronic notification to a computerized device of each of the additional one or more users.

20. The computer program product of claim 17, wherein the verifying that signatures from all of the one or more users have been collected comprises:
reading the value of the transaction candidate, to verify that it comprises signatures and identifiers of all of the one or more users.

* * * * *